T. B. FUNK.
FRAME FOR TRACTORS.
APPLICATION FILED JUNE 5, 1917.

1,280,436.

Patented Oct. 1, 1918.
3 SHEETS—SHEET 1.

Witness:

Inventor:
Truman B. Funk
by
Attys.

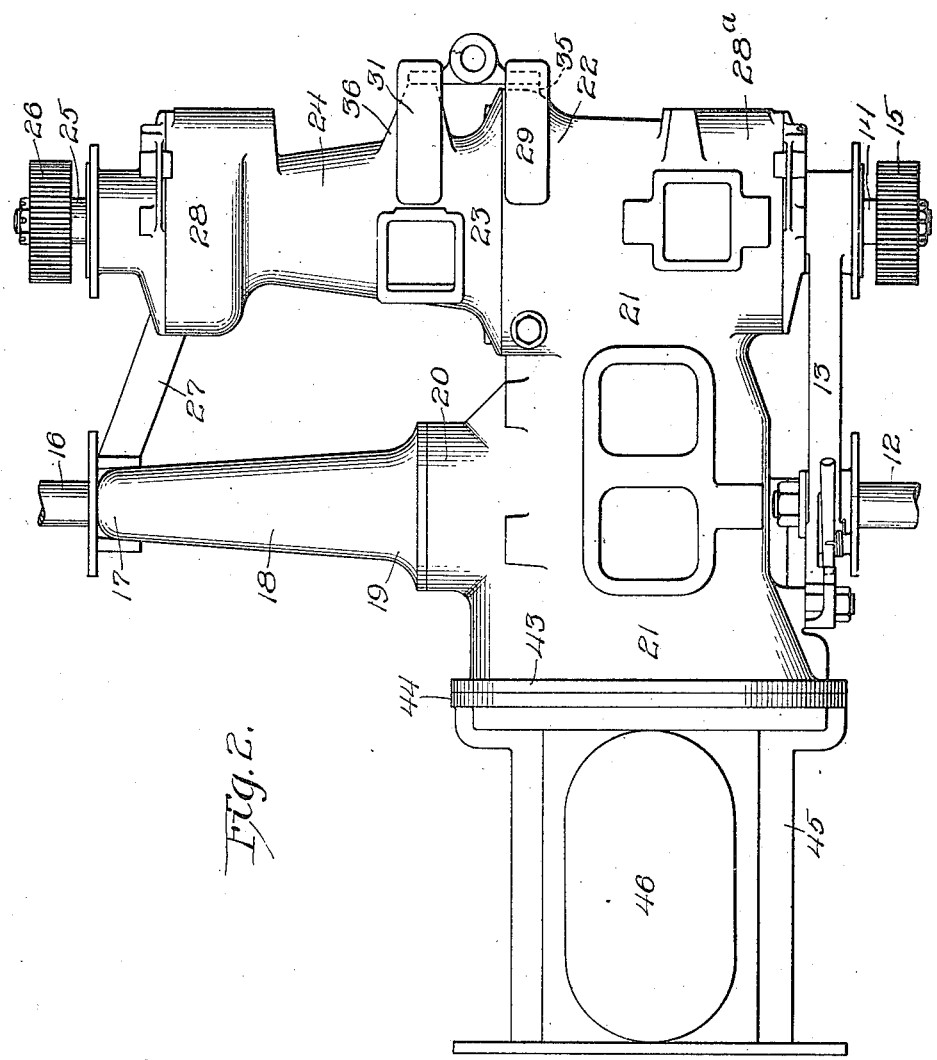

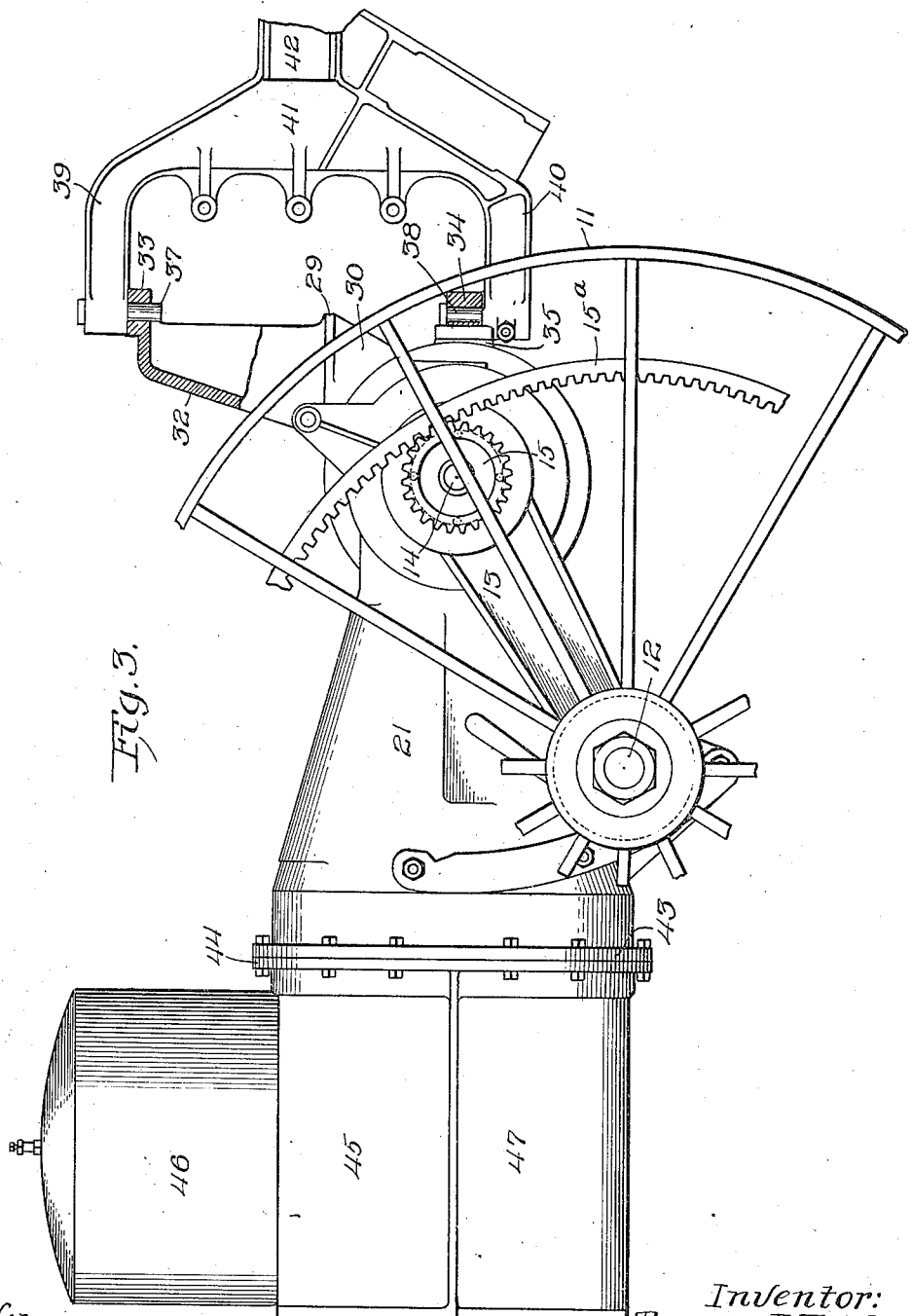

UNITED STATES PATENT OFFICE.

TRUMAN B. FUNK, OF MOLINE, ILLINOIS, ASSIGNOR TO MOLINE PLOW COMPANY, OF MOLINE, ILLINOIS, A CORPORATION OF ILLINOIS.

FRAME FOR TRACTORS.

1,280,436. Specification of Letters Patent. Patented Oct. 1, 1918.

Application filed June 5, 1917. Serial No. 173,016.

*To all whom it may concern:*

Be it known that I, TRUMAN B. FUNK, a citizen of the United States, residing at Moline, county of Rock Island, and State of Illinois, have invented certain new and useful Improvements in Frames for Tractors, of which the following is a specification.

The tractor frame of the present invention is designed as a base or mounting for the engine, transmission, and ground wheels of a tractor of the unstable type, by which is meant a tractor which is mounted or balanced upon two ground wheels, and which relies for its rear support upon that afforded by the trailing implement with which the tractor is associated. In view of the fact that the tractor is designed for use with various types of trailing implements, including cultivators and the like, it is highly desirable that the engine, transmission, and other operating parts of the tractor be elevated a sufficient distance above the ground to enable the tractor, as a whole, to straddle a row of corn or the like. The present invention is concerned with the formation and structure of the frame in order to conform to the conditions mentioned.

The object of the invention is to design, proportion, and arrange the various castings comprising the frame structure in such a manner that the frame, as a whole, will afford a firm, rigid, and compact mounting and housing for the various mechanisms mounted thereon. A further object of the invention is to so arrange the frame that the center of support afforded by the ground wheels will substantially coincide with the center of weight, thereby tending to balance the structure, as a whole, upon the ground wheels, which is highly desirable in order to secure the maximum tractive effort from the ground wheels, at the same time relieve the trailing implement as much as possible of the weight of the rear end of the tractor.

Another object of the invention is to construct the frame in such a manner as to minimize the number of castings required in its assembling, and at the same time afford the required access to its interior where the transmission, differential, and brake mechanisms are housed.

Further objects will appear from a detailed description of the invention which consists in the features of construction and combinations of parts hereinafter described and claimed.

In the drawings:

Fig. 2 is a plan view of the frame of the present invention; and

Fig. 3 is a side elevation of the frame.

Figure 1:
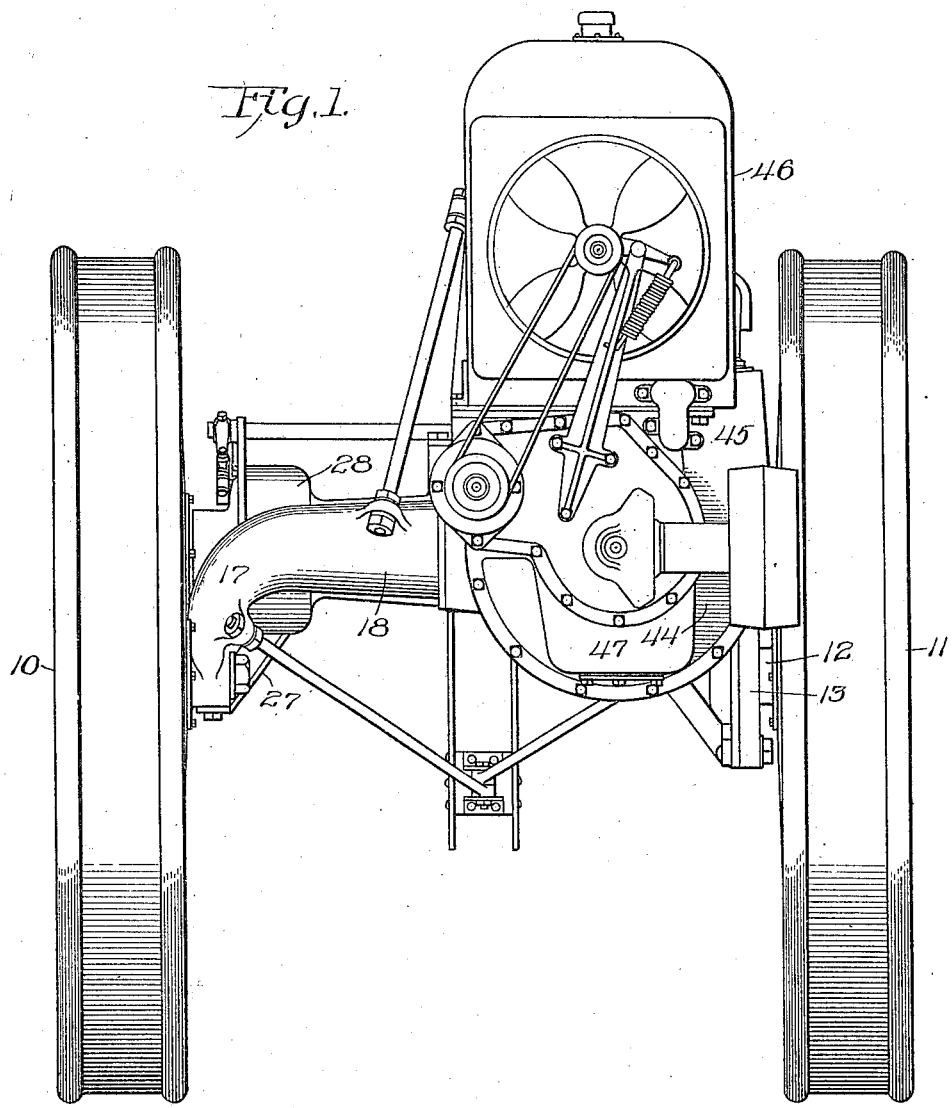
Figure 1 is a front elevation of a tractor embodying the frame of the present invention.

The tractor embodying the frame of the present invention is one which is carried by and mounted upon a pair of ground wheels 10 and 11 which are preferably located at or near the center of weight of the structure. Since the tractor is designed for use in association with plows or the like, the wheel 11, which constitutes the land wheel, is mounted upon a stub axle 12 carried by the free end of a swinging arm 13 mounted concentrically with respect to the land side section of the driving shaft 14 which carries the driving pinion 15, which latter meshes with an annular rack $15^a$, on the land wheel. The details of this adjustable mounting, however, form no part of the present invention, and further description thereof is deemed unnecessary.

The ground wheel 10 which constitutes the furrow wheel is mounted upon a stub axle 16 which outwardly projects from the down turned end 17 of a transverse supporting arm 18, the inner end 19 of which is outwardly flared and secured to a cylindrical boss 20 protruding from the furrow side of the main frame casing 21, which forms the foundation element of the present invention. The main frame casting is of generally conical shape being tapered from front to rear. This main frame is hollow and affords the housing for the transmission, differential, and clutch elements which transmit power from the engine to the pinions to actuate the ground wheels.

The main frame casing, at its rear or reduced end on the furrowside, is flared to afford a large generally cylindrical boss 22 having a flat plane outer attaching face, to which is secured the flared inner end 23 of a laterally projecting tapered tubular housing 24, through which projects the furrowside section 25 of the driving shaft carrying a driving pinion 26 for the furrow wheel which is a counterpart of the driving pinion previously referred to, and is mounted in alinement therewith. The tubular transmission housing 24 also serves as a means of reinforcement for the transverse supporting arm 18, the lower end of which is connected with the transversely extending transmission housing by means of a brace bar 27. The transmission housing, near its outer end, is enlarged to afford a cylindrical brake housing 28 which houses the furrowside brake. A similar brake on the landside is inclosed in a housing 28$^a$ constituting a cylindrical enlargement on the landside of the main casing at the rear end thereof.

Since the present invention is not concerned with the details of construction of the various operating elements which are housed within the main frame and its associated supporting elements, it is not deemed necessary to refer to these features in detail.

The rear end of the main frame has formed thereon, slightly to one side of the longitudinal center of the tractor, a flat supporting foot 29, the rear end of which is braced and supported by means of a web 30, and this foot coöperates with a similarly formed foot 31 formed on the transmission housing. These two feet furnish a base of support for an upstanding pivotal mounting 32, its upper end carrying an upper pivot socket head 33 coöperating with the lower pivot socket head 34, the ends of which are attached to bosses 35 and 36 formed, respectively, upon the rear face of the main frame and transmission housing at points immediately below the feet 29 and 31. The two socket heads afford pivotal mountings for upper and lower pivots 37 and 38 which extend inwardly into the pivot sockets from the upper and lower ends 39 and 40 of a yoke 41, the stem of which is connected with a rearwardly extending swinging bar 42, to which connection is made with the trailing implement or other rear support for the tractor. The details of these tractor connections form no part of the present invention, and need not be specifically referred to.

The main frame, in its forward or enlarged end, is provided with a flange 43 serving as a point of connection for a cap plate 44 of an engine frame 45, which cap plate is bolted or otherwise secured to the flange. The engine frame, as a whole, consists of an upper section 46 which constitutes a housing and support for the cylinders, radiator, and associated parts, and a lower section 47 which houses the pistons, crank shaft, and associated parts. The engine frame, as a whole, is built upon and forwardly projects from the disk-shaped cap plate which affords a closure for the forward end of the main frame to which it is bolted. This arrangement is one which enables the entire engine, including the cylinders, radiator, and crank shafting to be mounted as a unit on the forward end of the main frame which is highly desirable in assembling or disassembling the structure. At the same time the enlarged forward end of the main frame affords a sufficiently extended mounting surface for the engine parts to enable the latter to project forwardly from and be supported by the main frame without the necessity for providing additional points of support. With the parts mounted in this way, the weight of the engine will practically counterbalance the weight of the rear portions of the frame with the transmission elements housed therein, the result being that the center of weight will be coincident, or nearly so, with the center of support afforded by the ground wheels, which, it will be observed, find their mountings at a point considerably in advance of the center of the main frame.

The arrangement above described is one in which the engine will be located almost entirely to one side of the longitudinal center of the tractor, with the result that the center line will be practically unobstructed when it is desired to employ the tractor in cultivating operations in which the ground wheels will straddle a row of corn or the like. At the same time adequate provision is made for a firm and rigid mounting for the furrowside wheel of the tractor. By providing a frame which likewise constitutes a housing for the working parts, the frame may be made of sufficient transverse dimensions, being hollow, to obviate the necessity for employing numerous brace rods and bars which are objectionable, in that they tend to accumulate trash and complicate the structure to an undesirable degree.

In the present case, the forward and rear bosses which afford points of connection for the transverse supporting arm and transmission housing are of sufficient lateral dimensions to enable these portions of the structure to be bolted or otherwise attached at points sufficiently removed from the respective longitudinal centers, so that a complicated system of bracing is unnecessary. The arrangement is one which is simple, compact, and rigid, and which reduces the labor of assembling to a minimum, and at the same time completely protects the operating mechanism against the ingress of dirt and trash, and against the action of the elements.

I claim:

1. In a structure of the class described, the combination of a main frame of hollow formation designed to afford a housing for the transmission elements, an engine frame secured to the forward end of the main frame, a supporting arm secured to and outstanding from the main frame on one side thereof, a ground wheel carried by the supporting arm, and a companion ground wheel on the opposite side, the main frame being located to one side of the longitudinal center of the structure, substantially as described.

2. In a structure of the class described, the combination of a main frame of hollow formation designed to afford a housing for the transmission elements, an engine frame secured to the forward end of the main frame, a supporting arm secured to and outstanding from the main frame on one side thereof, a ground wheel carried by the supporting arm, a companion ground wheel on the opposite side, the main frame being located to one side of the longitudinal center of the structure, a transmission housing outstanding from the main frame at a point to the rear of the supporting arm, and driving elements carried by the transmission housing and the main frame and adapted to operate upon the respective ground wheels, substantially as described.

3. In a structure of the class described, the combination of a main frame of hollow formation designed to afford a housing for the transmission elements, an engine frame secured to the forward end of the main frame and forwardly extending therefrom, a supporting arm secured to and outstanding from the main frame on one side thereof, a ground wheel carried by the supporting arm, and a companion ground wheel on the opposite side, substantially as described.

4. In a structure of the class described, the combination of a main frame of hollow formation designed to afford a housing for the transmission elements, an engine frame secured to the forward end of the main frame and forwardly extending therefrom, a supporting arm secured to and outstanding from the main frame on one side thereof, a ground wheel carried by the supporting arm, and a companion ground wheel on the opposite side, the main frame being located to one side of the longitudinal center of the structure, substantially as described.

5. In a structure of the class described, the combination of a main frame of hollow formation designed to afford a housing for the transmission elements, an engine frame secured to the forward end of the main frame and forwardly extending therefrom, a supporting arm secured to and outstanding from the main frame on one side thereof, a ground wheel carried by the supporting arm, a companion ground wheel on the opposite side, a transmission housing outstanding from the main frame at a point to the rear of the supporting arm, and driving elements carried by the transmission housing and the main frame and adapted to operate upon the respective ground wheels, substantially as described.

6. In a structure of the class described, the combination of a main frame of hollow formation designed to afford a housing for the transmission elements, an engine frame secured to the forward end of the main frame and forwardly extending therefrom, a supporting arm secured to and outstanding from the main frame on one side thereof, a ground wheel carried by the supporting arm, a companion ground wheel on the opposite side, the main frame being located to one side of the longitudinal center of the structure, a transmission housing outstanding from the main frame at a point to the rear of the supporting arm, and driving elements carried by the transmission housing and the main frame and adapted to operate upon the respective wheels, substantially as described.

7. In a structure of the class described, the combination of a main frame of hollow formation designed to afford a housing for the transmission elements, an engine frame including a cap plate secured to the forward end of a frame and serving as a closure therewith, the engine frame extending forwardly from the main frame, a supporting arm secured to and outstanding from the main frame on one side thereof, a ground wheel carried by the supporting arm, and a companion ground wheel on the opposite side, substantially as described.

8. In a structure of the class described, the combination of a main frame of hollow formation designed to afford a housing for the transmission elements, an engine frame including a cap plate secured to the forward end of a frame and serving as a closure therewith, the engine frame extending forwardly from the main frame, a supporting arm secured to and outstanding from the main frame on one side thereof, a ground wheel carried by the supporting arm, and a companion ground wheel on the opposite side, the main frame being located to one side of the longitudinal center of the structure, substantially as described.

9. In a structure of the class described, the combination of a main frame of hollow formation designed to afford a housing for the transmission elements, an engine frame including a cap plate secured to the forward end of a main frame and serving as a closure therewith, the engine frame extending forwardly from the main frame, a supporting arm secured to and outstanding from the main frame on one side thereof, a ground wheel carried by the supporting arm, a companion ground wheel on the opposite side, a transmission housing outstanding from the main frame at a point to the rear of the supporting arm, and driving elements carried by the transmission housing and the main frame and adapted to operate upon the respective ground wheels, substantially as described.

10. In a structure of the class described, the combination of a main frame of hollow formation designed to afford a housing for the transmission elements, an engine frame including a cap plate secured to the forward end of a frame and serving as a closure therewith, the engine frame extending forwardly from the main frame, a supporting arm secured to and outstanding from the main frame on one side thereof, a ground wheel carried by the supporting arm, a companion ground wheel on the opposite side, the main frame being located to one side of the longitudinal center of the structure, a transmission housing outstanding from the main frame at a point to the rear of the supporting arm, and driving elements carried by the transmission housing and the main frame and adapted to operate upon the respective ground wheels, substantially as described.

11. In a structure of the class described, the combination of a main frame of hollow formation designed to afford a housing for the transmission elements, an engine frame secured to the forward end of the main frame and forwardly extending therefrom, a supporting arm secured to and outstanding from the main frame on one side thereof, a ground wheel carried by the supporting arm, an adjustable swinging arm swiveled to the opposite side of the main frame, and a companion ground wheel carried by the adjustable swinging arm, substantially as described.

12. In a structure of the class described, the combination of a main frame of hollow formation designed to afford a housing for the transmission elements, an engine frame secured to the forward end of the main frame and forwardly extending therefrom, a supporting arm secured to and outstanding from the main frame on one side thereof, a ground wheel carried by the supporting arm, an adjustable swinging arm swiveled to the opposite side of the main frame, and a companion ground wheel carried by the adjustable swinging arm, the main frame being located to one side of the longitudinal center of the structure, substantially as described.

13. In a structure of the class described, the combination of a main frame of hollow formation designed to afford a housing for the transmission elements, an engine frame secured to the forward end of the main frame and forwardly extending therefrom, a supporting arm secured to and outstanding from the main frame on one side thereof, a ground wheel carried by the supporting arm, an adjustable swinging arm swiveled to the opposite side of the main frame, a companion ground wheel carried by the adjustable swinging arm, and a swinging beam rearwardly extending from and pivoted to the main frame in alinement with the longitudinal center of the structure, substantially as described.

14. In a structure of the class described, the combination of a main frame of hollow formation designed to afford a housing for the transmission elements, an engine frame secured to the forward end of the main frame and forwardly extending therefrom, a supporting arm secured to and outstanding from the main frame on one side thereof, a ground wheel carried by the supporting arm, an adjustable swinging arm swiveled to the opposite side of the main frame, a companion ground wheel carried by the adjustable swinging arm, the main frame being located to one side of the longitudinal center of the structure, and a swinging beam rearwardly extending from and pivoted to the main frame in alinement with the longitudinal center of the structure, substantially as described.

15. In a structure of the class described, the combination of a main frame of hollow formation designed to afford a housing for the transmission elements, an engine frame secured to the forward end of the main frame, a supporting arm secured to and outstanding from the main frame on one side thereof, a ground wheel carried by the supporting arm, a companion ground wheel on the opposite side, the main frame being located to one side of the longitudinal center of the structure, and a rearwardly extending swinging beam pivoted to the rear end of the main frame in alinement with the longitudinal center of the structure, substantially as described.

16. In a structure of the class described, the combination of a main frame of hollow formation designed to afford a housing for the transmission elements, an engine frame secured to the forward end of the main frame and forwardly extending therefrom, a supporting arm secured to and outstanding from the main frame on one side thereof, a ground wheel carried by the supporting arm, a companion ground wheel on the opposite side, the main frame being located to one side of the longitudinal center of the structure, and a rearwardly extending swinging beam pivoted to the rear end of the main frame in alinement with the longitudinal center of the structure, substantially as described.

17. In a structure of the class described, the combination of a main frame of hollow formation designed to afford a housing for the transmission elements, an engine frame secured to and forwardly extending from the forward end of the main frame, a supporting frame secured to and outstanding from the main frame on one side thereof and downturned at its outer end, a ground wheel carried by the downturned end of the supporting arm, and a companion ground wheel on the opposite side, the main frame being located to one side of the longitudinal center of the structure, substantially as described.

TRUMAN B. FUNK.

Copies of this patent may be obtained for five cents each, by addressing the "Commissioner of Patents, Washington, D. C."